US008806022B2

(12) United States Patent
Hardy et al.

(10) Patent No.: US 8,806,022 B2
(45) Date of Patent: Aug. 12, 2014

(54) ESTABLISHING COMMUNICATION PATH GROUP IDENTIFICATION FOR MULTIPLE STORAGE DEVICES

(75) Inventors: Clint A. Hardy, Tucson, AZ (US); Matthew J. Kalos, Tucson, AZ (US); Beth Ann Peterson, Tucson, AZ (US); Dale F. Riedy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/104,002

(22) Filed: May 9, 2011

(65) Prior Publication Data

US 2012/0290729 A1 Nov. 15, 2012

(51) Int. Cl.
*G06F 15/16* (2006.01)

(52) U.S. Cl.
USPC .......................................................... 709/227

(58) Field of Classification Search
USPC .................................. 709/213–216, 227–228
See application file for complete search history.

(56) References Cited

U.S. PATENT DOCUMENTS 5,471,609 A * 11/1995 Yudenfriend et al. ......... 714/4.3
6,076,148 A * 6/2000 Kedem .......................... 711/162
7,085,956 B2 8/2006 Petersen et al.
7,437,608 B2 * 10/2008 Kalos et al. ...................... 714/16
2004/0100954 A1 * 5/2004 Dai et al. ....................... 370/389
2006/0085575 A1 * 4/2006 Hosouchi et al. ............... 710/38
2006/0106964 A1 * 5/2006 Clark et al. ................... 710/200
2007/0019016 A1 * 1/2007 Silverbrook et al. ........... 347/13
2009/0049218 A1 * 2/2009 Clark et al. ................... 710/200
2009/0193145 A1 7/2009 Coronado et al.

OTHER PUBLICATIONS

IBM Corp., "S/390 Internal Disk Subsystem: Reference Guide," Document No. SA22-1025-00, First Edition, Nov. 1999, Chapters 2 and 4.

* cited by examiner

*Primary Examiner* — Jason Recek
(74) *Attorney, Agent, or Firm* — David W. Victor; Konrad, Raynes, Davda and Victor LLP

(57) ABSTRACT

Embodiments of the disclosure relate to setting up a logical path group identification for multiple data storage devices. An aspect of the disclosure concerns a computer implemented method that comprises receiving a host command to establish a group of connection paths between the host and a plurality of storage devices, identifying the group of connection paths, adding each one of the storage devices to the group of connection paths, and reporting to the host those storage devices that could not be successfully added to the group of connection paths. The method maintains host access security to the storage devices by not grouping a device when it is a reset event state.

20 Claims, 7 Drawing Sheets

ESTABLISHING COMMUNICATION PATH GROUP IDENTIFICATION FOR MULTIPLE STORAGE DEVICES

The disclosure relates generally to computer data storage, and more particularly to setting up communication paths between a host computer and a group of data storage devices in a system start-up process.

BACKGROUND

A computer storage system at a data center typically includes many data storage devices (e.g., disks, tapes, solid state devices, etc.) that are connected to one or more storage controllers (control units). In operation, the storage controllers receive commands from host computers to establish logical connections with the devices and execute I/O processes with the devices. For large computer systems such as those based on the IBM zSeries™ architecture, the host computers may include multiple channel subsystems for handling the complex and concurrent I/O processing of the large number of storage devices and controllers. The channel subsystems typically communicate with the storage controllers by issuing host commands in the form of channel command words (CCWs).

For enhanced performance and reliability, the host channel subsystems generally set up and manage multiple logical paths between a host and a storage device. In order to perform I/O operations on a particular storage device, a host computer needs to bring the storage device online by initially establishing a group of logical paths between a host and the target storage device. The host's channel subsystem may issue a command to a storage controller with connections to the storage device to designate the device for I/O communication by the host through certain logical paths.

For example, in the IBM S/390™ and zSeries™ architectures, a host channel may issue a Set-Path-Group-ID (SPID) command as part of the device bring-up process. In current implementations, the host may need to issue a SPID command for each storage controller on the logical paths. For example, if there are 8 logical paths associated with the host, the host would need to send 8 separate SPID commands to the associated storage controllers in order to bring a target device online.

With the large number of storage devices in a typical user environment, the amount of I/O processing and error recovery due to the bring-up of these storage devices would result in significant system overheads for the hosts and storage controllers.

BRIEF SUMMARY OF THE DISCLOSURE

The disclosure relates to setting up a logical path group identification of multiple data storage devices in a computer data storage system during start-up. The data storage system may be coupled to host computers through storage controllers which provide multiple connection paths to the storage devices. One aspect of the disclosure concerns computer program product comprising a computer readable storage medium having computer readable program code embodied therewith. The computer readable program code may comprise program code configured to receive a host command to establish a group of connection paths between the host and a plurality of storage devices, program code configured to identify the group of connection paths, program code configured to add each one of the storage devices to the group of connection paths, and program code configured to report to the host those storage devices that could not be successfully added to the group of connection paths. The controllers may maintain host access security to the storage devices by not grouping a device when the device is a reset event state.

A second aspect of the disclosure concerns a computer implemented method that may comprise receiving a host command to establish a group of connection paths between the host and a plurality of storage devices, identifying the group of connection paths, adding each one of the storage devices to the group of connection paths, and reporting to the host those storage devices that could not be successfully added to the group of connection paths.

A third aspect of the disclosure concerns a system that may comprise a logic component for receiving a host command to establish a group of connection paths between the host and a plurality of storage devices, a logic component for identifying the group of connection paths, a logic component for adding each one of the storage devices to the group of connection paths, and a logic component for reporting to the host those storage devices that could not be successfully added to the group of connection paths.

The details of the embodiments of the disclosure, both as to their structure and operation, are described below in the Detailed Description section in reference to the accompanying drawings. The Brief Summary is intended to identify key features of the claimed subject matter, but it is not intended to be used to limit the scope of the claimed subject matter.

DETAILED DESCRIPTION OF THE DISCLOSURE

The disclosure describes exemplary embodiments of systems and methods for establishing a logical path group identification of multiple data storage devices in a computer system during the bring-up of the devices. The devices may be connected to multiple host computers through one or more storage controllers. The logical path group identification allows a host to request a storage controller to designate a particular storage device for I/O communication by the host through the logical paths in the identified path group.

Figure 1:
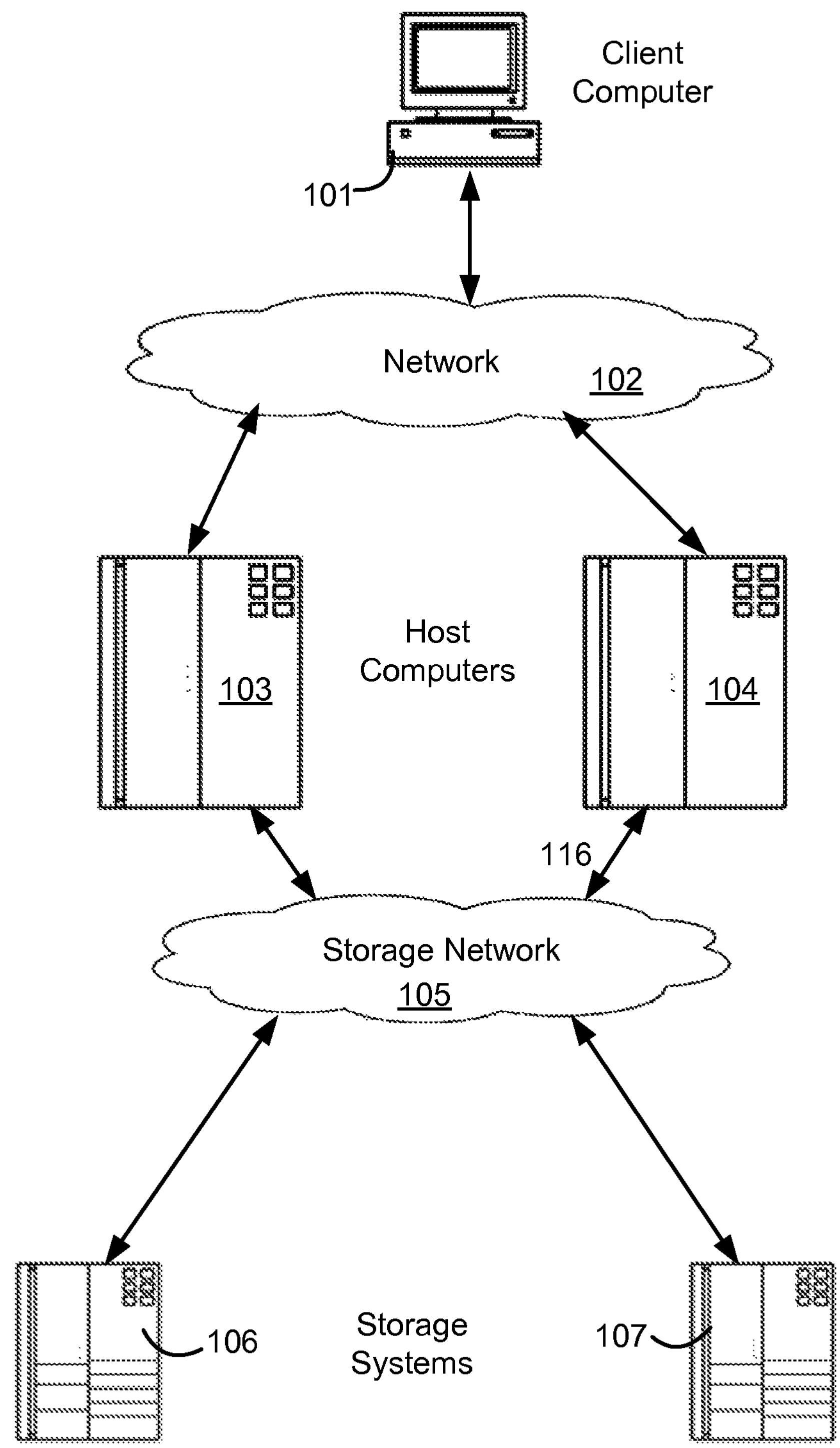
FIG. 1 illustrates an exemplary configuration of computers, networks and storage systems in which aspects of the invention may be provided.

Referring now to the drawings and in particular to FIG. 1, there is illustrated an example of a computer and data storage configuration in which aspects of the disclosure may be implemented. The computer and data storage configuration in FIG. 1 is presented only by way of example and is not intended to be limiting. The systems and methods disclosed herein may be applicable to a wide range of computers, servers, storage systems, and network architectures, in addition to the configuration in FIG. 1. The illustrated configuration may comprise multiple client computers 101 that access multiple host computers 103-104 through a computer network 102. The computer network 102 may be a wide area network (WAN), a local area network (LAN), a private intranet, or the Internet.

Host computers 103-104 may include CPUs (Central Processing Units) and memory for executing various programs, thereby providing a variety of computing functions to client computer 101. For example, the host computers 103-104 may be servers that host applications for providing computing services such as web services and database applications. In certain embodiments, host computers 103-104 may comprise IBM System Z computers, such as System z9®, System z10®, zSeries®, etc. The host applications running on computers 103-104 may include a storage management program for managing the operation of data storage systems in the illustrated configuration.

The computer and data storage configuration in FIG. 1 may include one or more storage systems 106-107 for storing data. Multiple storage systems 106-107 may be connected to each other and to the hosts 103-104 by a storage network 105. The storage network 105 may be a storage area network (SAN), a LAN (Local Area Network), a Fibre Channel interface or other host interface protocols. A SAN is a dedicated high performance network between servers and storage resources, such as Fibre Channel (FC), Enterprise Systems Connection (ESCON), Small Computer Systems Interface (SCSI), Internet SCSI (iSCSI), Serial Storage Architecture (SSA), High Performance Parallel Interface (HIPPI), or other protocols with similar functions.

In certain embodiments, storage network 105 may comprise one or more network switches such as router switches. The network switches may comprise Enterprise Systems Connection (ESCON) switches, a FICON (Fiber Connectivity) switches, and/or combinations thereof that couple host computers 103-104 to the storage system 106-107.

Figure 2:
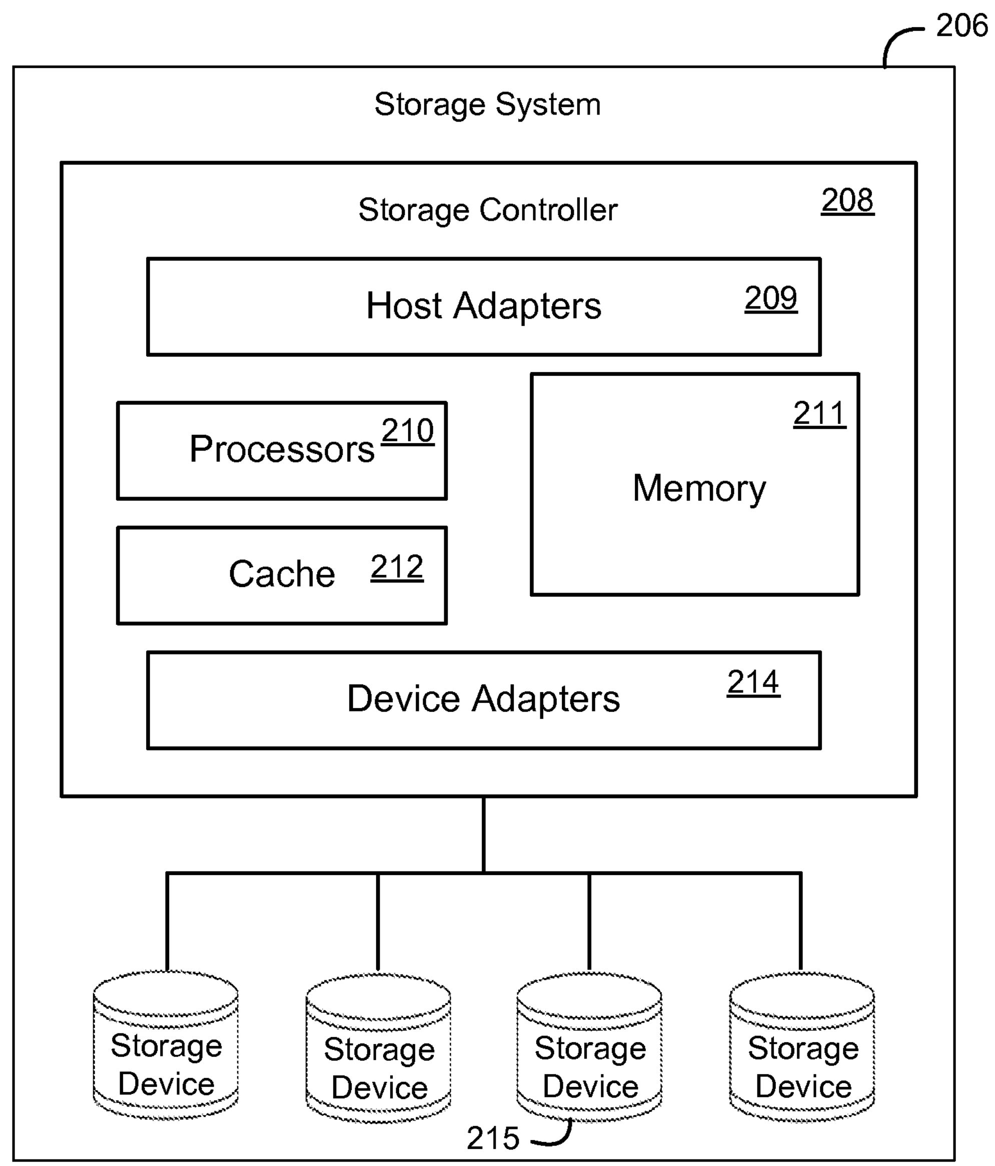
FIG. 2 illustrates a block diagram of the components in a representative data storage system that may be used for providing aspects of the invention, in accordance with an exemplary embodiment.

A data storage system 106-107 may comprise hard disk drives, solid state drives, arrays of hard disk drives or solid-state drives, tape drives, tape libraries, CD-ROM libraries, or the like. Further, the data storage system 106-107 may comprise multiple storage levels such as a primary level of solid state storage, a secondary level of disk storage, and a third level of tape libraries. Host computers 103-104 may generate data and provide data to the storage systems 106-107 to be stored on storage devices that the storage systems have access to, as illustrated in FIG. 2. Host computers 103-104 may similarly read data from data storage systems 106-107.

A data storage system 106-107 may include one or more storage controllers, disk arrays and tape libraries. For example, storage systems 106-107 may comprise IBM TotalStorage™ systems DS8000®. The DS8000® systems are high-performance, high-capacity storage controllers providing disk storage to support continuous operations. In another embodiment, a storage system 106-107 may be an IBM System Storage™ TS3500® tape library system. Users and computer programs may store data on storage systems 106-107 and retrieve data from them, using various data processing applications running in the hosts 103-104 and the storage systems 106-107.

FIG. 2 is a block diagram of the components in a representative data storage system 206, in accordance with an exemplary embodiment of the invention. The data storage system 206 may comprise a storage controller 208 that is connected to a plurality of data storage devices 215. The storage controller 208 may comprise one or more host adapters 209 that are connected to storage network 105. Host adapters 209 allow the storage controller 208 to communicate with hosts 103-104 using an host-device I/O interface protocol such as Fibre Channel (FC), Fibre Channel Arbitration Loop (FC-AL), Infiniband, Gigabit Ethernet, Ethernet, TCP/IP, iSCSI, SCSI I/O interface. Each host adapter 209 may include one or more I/O ports, e.g., ESCON ports.

The storage controller 208 may communicate with the data storage devices 215 using an I/O protocol which may include without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA). A data storage device 215 generally includes an information storage medium such as a magnetic disk, magnetic tape, CD, DVD (Digital Versatile Disk), HD-DVD (High Definition DVD), BD (Blue-Ray Disk) and the like. In other embodiments, the information storage medium may comprise a PROM, EPROM, EEPROM, Flash PROM, compact flash, smart media, a holographic medium, and the like.

The storage controller 208 may include one or more processors 210 for for controlling and performing the operation of the storage controller 208, and communicating with the host computers 103-104 and data storage devices 215. The storage controller 208 may comprise one or more units of memory 211 and cache 212 for holding computer program instructions and data associated with the control and processing functions in the storage controller 208. Cache 212 is a high-speed memory for temporarily storing data and quickly accessing the temporary data during operation.

Data storage system 206 may comprise a logical configuration in which various storage devices 215 in the data storage system 206 are configured as one or more logical objects, logical subsystems, logical unit numbers, and/or logical volumes. For example, a storage system administrator may create a logical configuration for data storage system 206 using the z/Architecture® provided by IBM Corporation. The storage devices 215 may be accessed through various physical and logical paths, and various communication paths between a host 103-104 and a storage controller 106-107.

Figure 3:
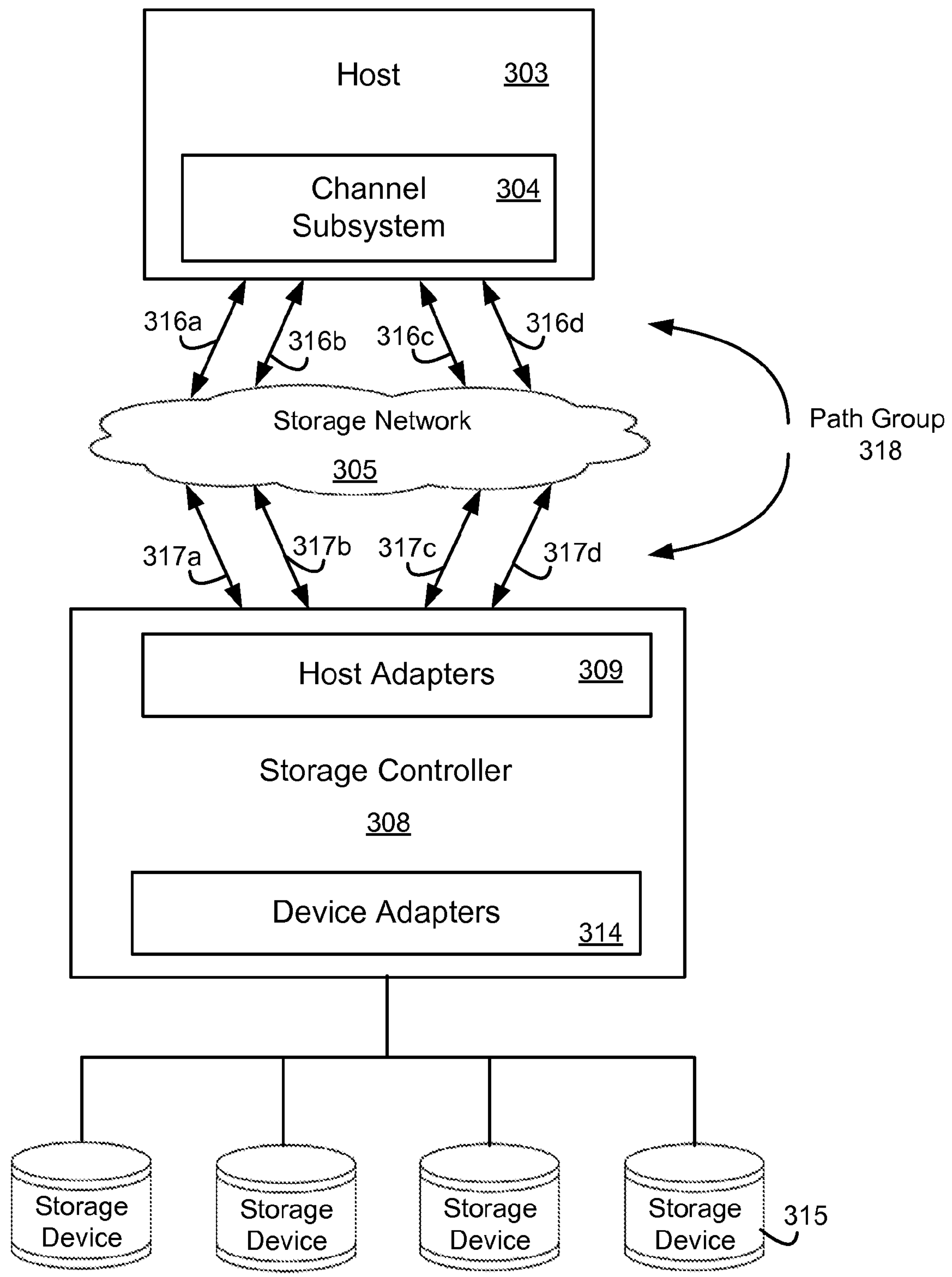
FIG. 3 illustrates a configuration of host computer, storage controller, and storage devices with multiple host-device communication paths, in which aspects of the invention may be provided in accordance with an exemplary embodiment.

FIG. 3 illustrates multiple physical and logical communication paths between a host computer 303 and a storage controller 308 in which aspects of the invention may be provided. The host computer 303 may be coupled to the storage controller 308 via input/output (I/O) channel subsystem 304. The host computer 303 may include multiple such I/O channel subsystems 304. Storage controller 308 provides the logical capabilities required to operate and control one or more data storage devices 315, and adapts the characteristics of each data storage device 315 to respond to control initiated by a channel program from the host 303.

An I/O channel 304 may comprise a FCP (Fibre Channel Protocol) channel, a FICON (Fibre Connection)/ESCON (Enterprise Systems Connection) channel, and/or combinations thereof. For example, in certain embodiments, host 303 may comprise a System Z server from IBM Corporation that supports Fibre Channel Protocol I/O architecture and/or FICON/ESCON I/O architecture.

A storage controller 308 may be housed separately from the data storage devices 315. In other embodiments, the storage controller 308 may be physically and logically integrated with the data storage devices 315. The storage controller 308 may be physically and logically integrated within a channel subsystem 309 host 303. For example, host 303 may include an IBM System Z server wherein a storage controller is physically and logically integrated within the channel subsystem of the server.

As illustrated in FIG. 3, a channel subsystem 304 may comprise multiple channel paths, such as channel paths 316*a*, 316*b*, 316*c*, and 316*d* wherein host computer 303 sends commands and data across the channel paths 316*a*, 316*b*, 316*c*, and 316*d*, to the data storage devices 315. The channel paths 316*a*, 316*b*, 316*c*, and 316*d* may be coupled to a control unit port on a host adapter 309 in the storage controller 308. The channels paths 316*a*, 316*b*, 316*c*, and 316*d* may include physical paths, logical paths, and combinations thereof. The host computer 303 may include a channel path identifier (CHPid) that is connected to storage network 305 and capable of identifying the communication paths between the host computers 303 and the storage controller 308.

The channel paths 316*a*, 316*b*, 316*c*, and 316*d* may be grouped into a channel path group, such as channel path group 318. The communication between the host 303 and a data storage device 315 occurs on multiple paths in the path group 318. A data storage device 315 may be assigned for exclusive use with one or more paths of the communication path group 318. For example, host 303 may reserve a particular data storage device 315 for a period of time to perform a sequence of operations on this storage device through the assigned paths.

In order to set up a group of logical paths between the host 303 and a storage device 315 for I/O processing, the host 303 may issue a channel command to the storage controller 308, such as a Set-Path-group-ID (SPID) command. The SPID command informs the targeted data storage device 315 of the identity of the host computer 303 and the logical communications paths between the host 303 and the target storage device 315. The SPID command may be further issued by the host 303 to resign or disband logical paths and paths groups for a designated data storage device 315, or to remove a designated port from an existing path group 318.

The host channel subsystem 304 generally issues an SPID command for each storage device 315 that the host 303 brings online during the initial bring-up process. For example, in the current zSeries™ architecture, a zSeries™ server may access up to 256 storage devices that are connected to a storage controller coupled to the server. In such configurations, a zSeries™ host may need to issue 256 SPID commands, one for each device that it brings up. Due to the large number of hosts 303 and storage devices 315 in a typical data center, system resources associated with the processing of such a large number of SPID commands and their error recovery become significant overheads when these devices are brought online together.

Embodiments of the invention minimizes these overheads by establishing communications paths for multiple storage devices in a single channel command. For example, a host 303 may issue a single Set-Path-group-ID (SPID) command to a storage controller 308 to establish the logical connections for up to 256 devices that are attached to the storage controller 308.

Figure 4:
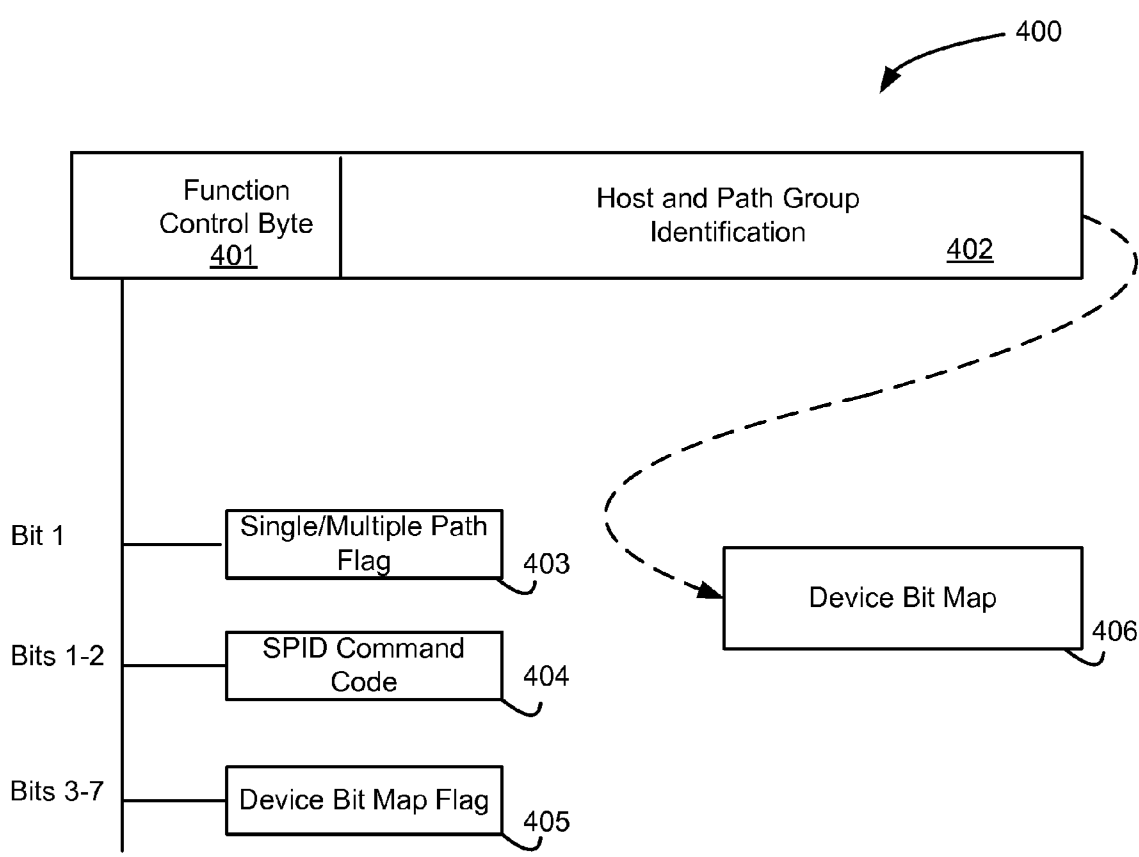
FIG. 4 illustrates an exemplary embodiment of a Set-Path-group-ID (SPID) for establishing a logical path group for multiple storage devices, in accordance with an embodiment.

FIG. 4 illustrates an example of a host channel command 400 for establishing a path group identification for multiple storage devices (i.e., Set-Path-group-ID or SPID). In one embodiment, the SPID command 400 comprises 12 bytes of data of control information and data relating to the path group for the targeted data storage devices. The SPID command 400 may include one byte of function control code (FCB) 401 and eleven bytes of host and path group identification data (PGID) 402. The function control byte 401 may describe logically how the paths are to be associated and identify a group code that describes to a data storage device 315 how paths 316*a*, 316*b*, 316*c*, and 316*d* are to be logically associated, (e.g., establish, resign, disband, and/or remove port). The function control byte 401 may indicate a single-path mode or a multi-path mode. For example, when a communications path is set to a multi-path mode, data storage device operations may be initiated over any path of a path group.

As illustrated in FIG. 4, an initial bit 403 in the function control byte 401 may indicate whether the SPID command sets up a single-path mode or a multi-path mode. A 2-bit command code 404 represents the type of path group operation for the current SPID command. For example, a value of "00" for the 2-bit command code 404 corresponds to an "Establish" operation, in which the SPID command forms a path group for an addressed storage device where the path group consists of all channel paths with the matching identification PGID command. A value of "01" for the 2-bit code 404 corresponds to a "Disband" operation, in which the SPID command places each channel path for an addressed storage device in an "ungrouped" state. A value of "10" for the 2-bit code 404 corresponds to a "Resign" operation, in which the SPID command removes the issuing channel from the channel path group for an addressed storage device.

Bits 3-7 of the function control byte (FCB) 401 may include various flags and data specifying other types, conditions, and parameters for a particular path group. In one embodiment, bits 3-7 of the function control byte (FCB) 401 in the channel SPID command 400 may include a "device bit map" flag indicating whether the channel path group is being established for multiple storage devices or a single device. In addition, the SPID command 400 may include a bit map 406 that indicates the storage devices associated with the channel path group that the host is addressing via the SPID command. The device bit map 406 may follow the normal 12 bytes of the SPID command. If the "device bit map" flag is set, then the storage controller may determine from the bit map which devices should be added to the path group for a channel path and path group ID.

In an alternate embodiment, bits 3-7 of the function control byte (FCB) 401 may comprise a list of the storage devices addressed by the SPID command 400. Using the device list, the storage controller 308 may determine which devices 315 to include, or not to include, in the current path group.

Under certain conditions, the storage controller 308 may not be able to add all the specified storage device to a path group, for example, where the host 303 does not currently have access to a designated storage device 315. The storage controller 308 may return a notification to the host 303 on the success or failure of the SPID path group operation for the addressed storage devices 315. In an exemplary embodiment, the storage controller 308 may return a "Channel End" and "Device End" (CE/DE) status to the host 303's channel upon successfully receiving the SPID command 400 and verifying its parameters. Once the processing of the SPID command 400 for all specified devices has completed, the storage controller 308 may return an attention message to the host 303 to notify the host 303 of the devices 315 that were successfully added to the group. The host 303 may issue the next chain of channel commands on any of the storage devices 315 that were successfully processed by the SPID command 400. The return message may include both the devices 315 that were successfully processed and those that could not be added to the current path group.

In an alternate embodiment, the storage controller 308 may provide a mechanism for the host 303 to receive failure information resulting from the processing of a SPID command 400 for multiple storage devices 315. For example, the storage controller 308 may allow a "Read Subsystem Data" (RSSD) command to follow a SPID command 400 that designates multiple storage devices 315. As the storage controller 308 processes each designed device 315, it keeps track of the success or failure of the path group processing for this device. If there is a failure among the processing of all designated devices 315, the storage controller 308 could generate a message describing the state of the failed device and provide a Channel End/Device End (CE/DE) status to the host channel.

With a "Read Subsystem Data" (RSSD) command immediately following the SPID command in the chain, the RSSD command would read the information message generated earlier by the storage controller 308 during the processing of the SPID command. The RSSD command results in a unit exception (UE) status and is also the last command in the current command chain.

In order to assure that the host 303 has access to a storage device 315 that it designates in a SPID command for a group of storage devices as part of the device bring-up, the host may issue other I/O commands to the device 315 through the available channel paths before issuing the SPID command 400. Such I/O commands to this particular device 315 would clear the "reset notify state" for the paths to the device 315 and assure that the host 303 has access to this device 315.

Figure 5:
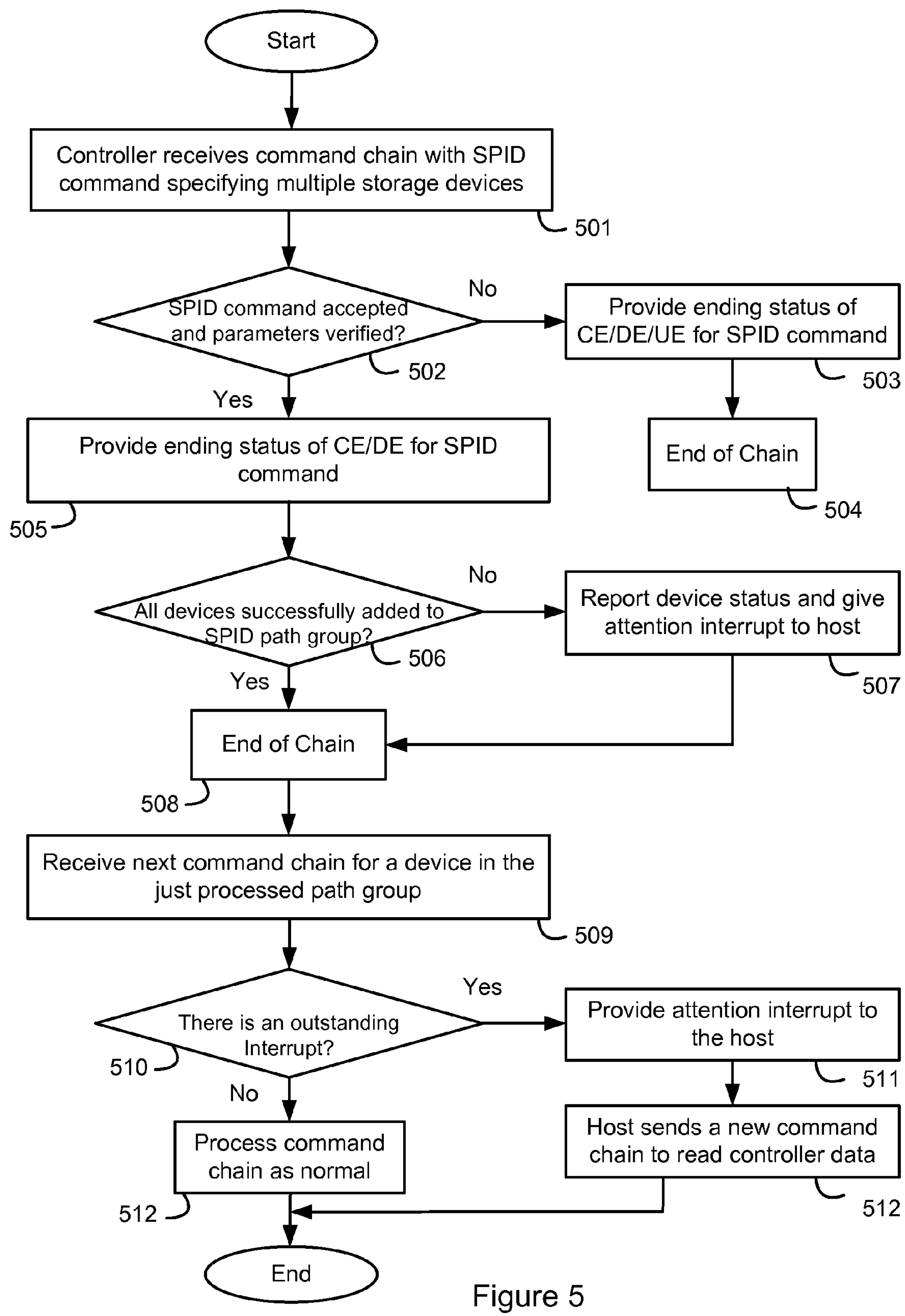
FIG. 5 is a flowchart of an exemplary process for processing a chain of host channel commands that includes a SPID command to establish a path group ID for multiple storage devices, in accordance with an embodiment.

FIG. 5 is a flowchart illustrating an exemplary method for processing a chain of host channel commands that includes a SPID command 400 to establish a path group ID for multiple storage devices 315. In this embodiment, a storage control unit could give a Channel End/Device End (CE/DE) status to the SPID command once the command is accepted and the parameters verified. Once the actual SPID command processing for each of the devices has completed, the storage control unit could raise an attention for the next chain issued by the host on any of the devices in a logical subsystem used by that SPID command. The attention message would describe the devices that were successfully processed or conversely the devices that were not successfully processed or even an indication of both states. Thus, the host would be able to evaluate which devices were processed as desired.

FIG. 5 illustrates an example of a channel command chain received by the storage controller 308 at step 501. If the storage controller 308 cannot successfully accept and verify parameters in the SPID command 400, per step 502, then the storage controller 308 may give an ending status of Channel End and Device End (CE/DE) to the host channel, for the SPID command, at step 503. The processing of the current chain of commands ends at step 504.

If the storage controller 308 can successfully accept the SPID command 400 and verify the SPID command parameters, the storage controller 308 could provide an ending status of Channel End/Device End for the SPID command at step 505. The storage controller 308 may then process the SPID command for each storage device 315 that the host specified in the SPID command, using the device bit map in the SPID command parameters. During this processing, the storage controller 308 may keep track of information on whether or not a device 315 could be successfully added to the path group. If all of the specified devices 315 were successfully added to the group, then the processing of the host 303's command chain ends at step 508. However, if one or more storage devices 315 could not be added to the path group, then the storage controller 308 may report the device failure status to the host 303 and raise an attention interrupt to alert the host 303 of the device grouping failure, at step 507. The processing of the current command ends at step 508.

At step 509, the storage controller 308 may receive a subsequent command chain for a storage device 315 that was designated in the just processed path group. The storage controller 308 determines whether there is an outstanding interrupt at step 510. If there is an outstanding interrupt, the storage controller 308 provides an attention interrupt to the host 303 at step 511. The host 303 would include a command to read the storage controller 308's data in the next command chain sent to the storage controller 308. The command to read the controller data may be, for example, a "Read Subsystem Data" (RSSD) command in the zSeries® architecture.

At step 510, if the storage controller 308 determines that there is no outstanding interrupt, the storage controller 308 processes the host command chain as it normally does without raising an interrupt to the host 303 for a previous failed processing of a device path grouping operation.

Figure 6:
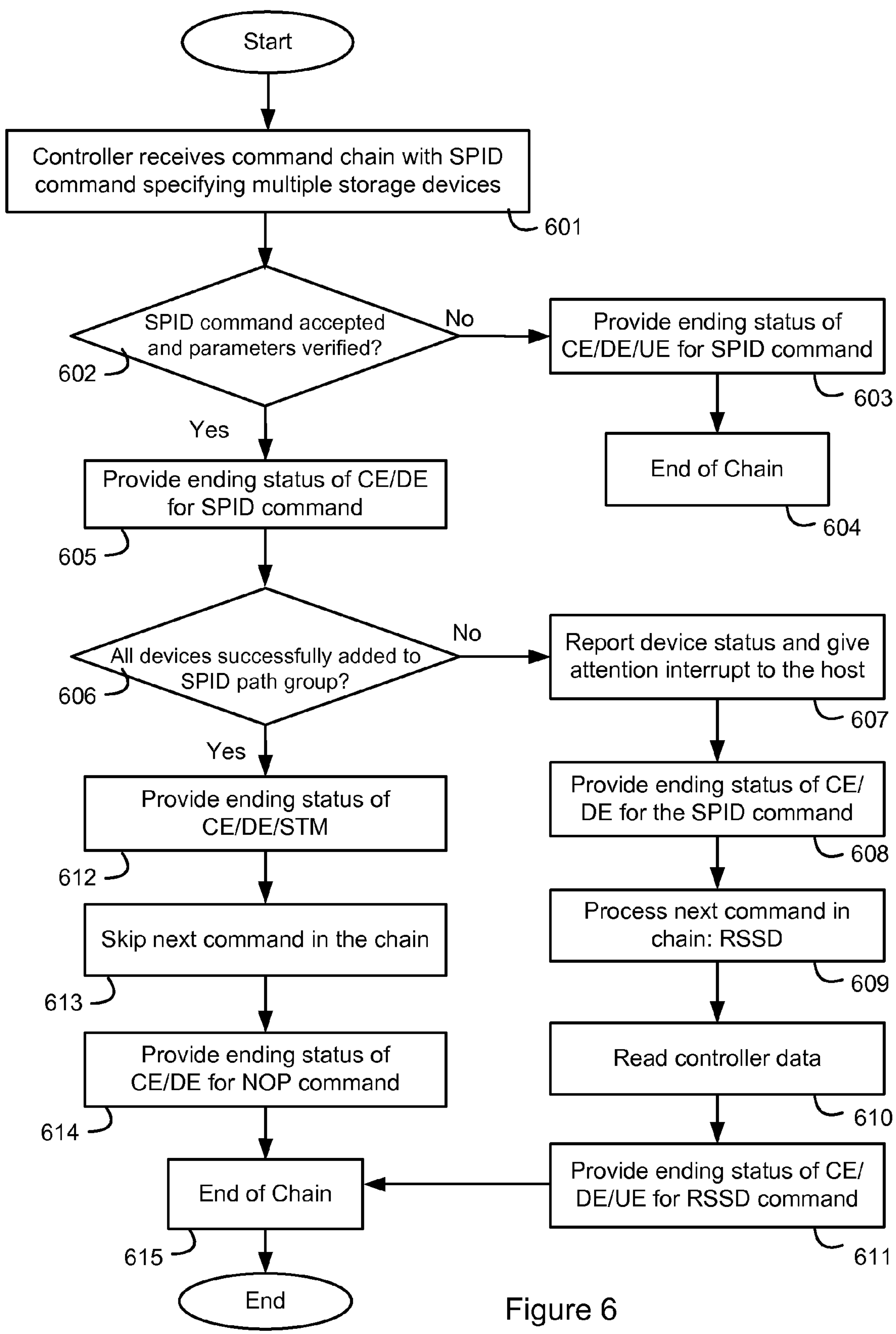
FIG. 6 is a flowchart of an exemplary process for processing a command to establish a path group ID for multiple devices, in which the storage controller returns to the host information about a failure in adding the devices to the path group, in accordance with an embodiment.

FIG. 6 is a flowchart illustrating an exemplary embodiment for processing a command to establish a path group ID for multiple devices 315, in which the storage controller 308 returns to the host 303 information about the failure of adding one or more devices 315 to the path group. In this embodiment, the control unit could leverage channel architecture to provide a method to read a message in the event of any device grouping failure rather than raising attentions and requiring a new Start I/O command. Typically, no other command may follow the SPID command in a chain. In the current embodiment, a storage control unit would need to allow additional commands to follow the SPID command. The chain would consist of a SPID command followed by a RSSD command followed by a "no operation" (NOP) command.

Normal command processing in the storage control unit would first occur (e.g., acceptance of a Start I/O, acceptance of a CCW, verification of parameters, etc.). Then as the control unit processes the path grouping for each device, the storage control unit would keep track of successes and failures by device. If there was a single failure, the control unit would generate a message describing the state of the device. As before, it could be a list of the devices successfully process, failed to process, or both. In this case, the storage control unit would give Channel End/Device End (CE/DE) status and the next command in the chain would be the RSSD command. The RSSD (Read Subsystem Data) command would read the message generated during the SPID command processing. Then the RSSD command would give unit exception status and end our chain. Otherwise, if all of the device specified could be successfully processed, the control unit would give a Channel End/Device End/Status Modifier (CE/DE/STM) status. This status will cause the channel to 'jump' over the RSSD command (as the next command in the chain) and issue the NOP. Thus, the storage control unit would have an efficient way to signal the host as to a failure processing any of the devices within the same chain. This method of processing a chain is used today for Multi-Path Lock Facility (MPLF) commands but is not used for any other CCWs and would be a new behavior for the SPID command.

With the returned failure information, the storage controller 308 does not need to raise an attention interrupt to the host and require a new Start I/O command. In an embodiment, a host channel command may include a SPID command followed by a RSSD command (to read the subsystem data) and a NOP (no operation). The storage controller 308 would perform the normal processes of accepting a Start I/O command, accepting the channel command chain, and verifying the command parameters.

As the storage controller 308 processes each designated storage device 315, the storage controller 308 keeps track of the status of the device operation, i.e., whether the path grouping operation for the device succeeded or failed. If there were failures during the path group processing for one or more designated devices 315, the storage controller 308 generates a message describing the state of the devices. The message may include a list of the devices 315 that were successfully processed, unsuccessfully processed, or both. In this case, the storage controller 308 would give a Channel End/Device End (CE/DE) status to the host channel and process the next command in the chain, which would be a "Read Subsystem Data" command (RSSD). The "Read Subsystem Data" command reads the message generated by the storage controller 308 during the SPID command processing. The storage controller 308 gives a Unit Exception status for the RSSD command and ends the current command chain.

If all of the devices 315 specified in the SPID command were successfully processed, the storage controller 308 may issue a Channel End/Device End/Status Modifier (CE/DE/STM) status to the host. This status will cause the host channel to skip the RSSD command (as the next command in the chain) and issue the NOP command to the storage controller 308. The storage controller 308 thus has an efficient way to signal the host 303 regarding a failure in processing any of the devices 315 within the same chain.

In order for a host channel command to be issued to a device 315, it is necessary to confirm that the host 303 has a connection path to the device 315 and can communicate with the device 315. In the case of a SPID command designating multiple storage devices 315, the host's connection path to a device 315 may be confirmed by assuring that the device 315 is not in a "reset notify state" for that path. The "Reset Notify State" is only cleared by a host if an I/O operation is issued through that path to the device. Thus, if the path to that device 315 is not in a "Reset Notify State", then the host 303 has access to the device 315. If the host 303 has access to that device 315, as a part of bringing the device 315 online, the host may issue other commands to the device 315 through this connection path before the SPID command, which would clear the "Reset Notify State".

The flowchart in FIG. 6 illustrates the operations described above. At step 601, the storage controller 308 receives a command chain that includes a SPID command for multiple storage devices 315. If the storage controller 308 cannot successfully accept the SPID command and verify its parameters, per step 602, then the storage controller 308 provides an ending status of Channel End, Device End and Control Unit End (CE/DE/CU) to the host channel for the SPID command, at step 603. The processing of the current chain of commands ends at step 604. If the storage controller 308 can accept the SPID command and verify its parameters, then the storage controller 308 returns the ending status of Channel End/Device End (CE/DE) to the host 303, at step 605.

The storage controller 308 may determine at step 606 whether all of the devices 315 in the SPID command were successfully processed. If their processing was successful, the storage controller 308 provides the ending status of Channel End/Device End/Status Modifier (CE/DE/STM) to the host, at step 612, and skip the next command (i.e., a RSSD command) in the chain, at step 613. The storage controller 308 provides the ending status of Channel End/Device End check for the next command in the chain, which is a NOP, at step 614. The processing of the current command chain ends at step 615 with an "end of chain" marker.

At step 606, if the storage controller 308 determines that one or more storage devices 315 could not be successfully processed, the storage controller 308 may report the device status to the host 303 and raise an attention interrupt with the host 303, per step 607. The storage controller 308 provides an ending status of Channel End/Device End for the SPID command, at step 608. The storage controller 308 then processes the next command in the chain, which is a RSSD command, at step 609. The RSSD command obtains storage controller data, which includes information on the devices 315 that could not be added to the identified path group, at step 610. Upon completion of the reading of the controller data, the storage controller provides the status of Channel End/Device End/Unit End (CE/DE/UE) for the RSSD command, at step 611, and reaches the end of the command chain, at step 615.

Figure 7:
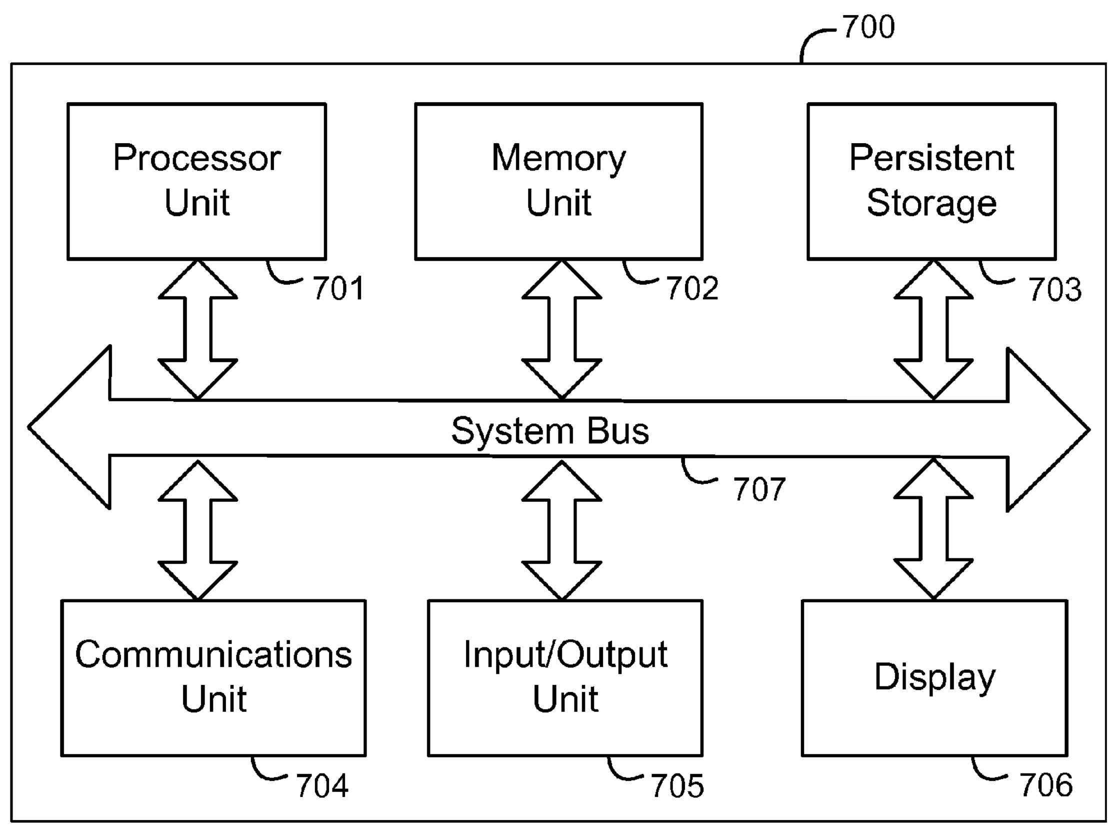
FIG. 7 illustrates a block diagram of a representative computer system that may be used in a distributed data sharing and storage system for providing aspects of the invention.

FIG. 7 illustrates a block diagram of a representative computer system that may be part of client computer 701, host computers 103-104, and storage controllers 106-107. Computer system 700 may include a processor unit 701, a memory unit 702, a persistent storage 703, a communications unit 704, an input/output unit 705, a display 706 and a system bus 707. Computer programs are typically stored in persistent storage 703 until they are needed for execution by an operating system (not shown) running in memory unit 702. At that time, the programs are brought into the memory unit 702 so that they can be directly accessed by the processor unit 701. The processor unit 701 selects a part of memory unit 702 to read and/or write by using an address that the processor 701 gives to memory 702 along with a request to read and/or write. Usually, the reading and interpretation of an encoded instruction at an address causes the processor 701 to fetch a subsequent instruction, either at a subsequent address or some other address. The processor unit 701, memory unit 702, persistent storage 703, communications unit 704, input/output unit 705, and display 706 interface with each other through the system bus 707.

As will be appreciated by one skilled in the art, aspects of the present disclosure may be embodied as a method, system or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and substitutions of the described components and operations can be made by those skilled in the art without departing from the spirit and scope of the present disclosure defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer program product comprising a computer readable storage device having computer readable program code embodied therewith, the computer readable program code comprising:

program code configured to receive a command indicating an operation comprising at least one of establish, disband, and resign with respect to a connection path group of logical connection paths between a host and a plurality of storage devices, wherein the command indicates the plurality of storage devices and the connection path group to which the operation is to be applied;

program code configured to perform the operation indicated in the command with respect to the logical connection paths of the connection path group and each one of the storage devices indicated in the command; and program code configured to report to the host information on a success or failure of the operation performed with respect to the storage devices.

2. The computer program product of claim 1, wherein the plurality of storage devices are identified by a bit map associated with the command, further comprising:

program code configured to process the command to inform at least one of the storage devices indicated in the command of the identity of the host.

3. The computer program product of claim 1, wherein the plurality of storage devices are identified by a device list associated with the command.

4. The computer program product of claim 1, wherein the computer readable program code comprises program code configured to present an ending status to the host upon successfully accepting the command and verifying command parameters of the command.

5. The computer program product of claim 1, wherein the operations comprises the establish to add the storage devices to the connection path group, wherein the computer readable program code comprises program code configured to, in response to at least one of the plurality of storage devices being unsuccessfully added to the connection path group, report a device status and present an attention interrupt to the host.

6. The computer program product of claim 1, wherein the operation comprises the establish to add the storage devices to the connection path group, wherein the computer readable program code comprises program code configured to process a command to read data resulting from the adding of the storage devices to the connection path group indicated in the command.

7. The computer program product of claim 1, wherein the operation comprises the establish to add the storage devices to the connection path group, wherein the computer readable program code comprises program code configured to, in response to all of the storage devices being successfully added to the connection path group:

receive a chain of commands for a storage device successfully added to the identified connection path group;

determine whether there is an outstanding attention interrupt; and if there is an outstanding attention interrupt, then present the outstanding attention interrupt to the host.

8. The computer program product of claim 1, wherein the operation comprises the establish to add the storage devices to the connection path group, wherein the computer readable program code comprises program code configured to, in response to a particular storage device being in a reset event state, skip the adding of the particular storage device to the connection path group.

9. A computer implemented method, comprising:

receiving a command indicating an operation comprising at least one of establish, disband and resign with respect to a connection path group of logical connection paths between a host and a plurality of storage devices, wherein the command indicates the plurality of storage devices and the connection path group to which the operation is to be applied;

performing the operation indicated in the command with respect to the logical connection paths of the connection path group and each one of the storage devices indicated in the command; and reporting to the host information on a success or failure of the operation performed with respect to the storage devices.

10. The method of claim 9, wherein the plurality of storage devices are identified by a bit map associated with the command, further comprising:

processing the command to inform at least one of the storage devices indicated in the command of the identity of the host.

11. The method of claim 9, further comprising presenting an ending status to the host upon successfully accepting the command and verifying command parameters of the command.

12. The method of claim 9 wherein the operation comprises the establish to add the storage devices to the connection path group, further comprising, in response to at least one of the plurality of storage devices being unsuccessfully added to the identified connection path group, reporting a device status and presenting an attention interrupt to the host.

13. The method of claim 9, wherein the operation comprises the establish to add the storage devices to the connection path group, further comprising processing a command to read data resulting from the adding of the storage devices to the connection path group indicated in the command.

14. The method of claim 9 wherein the operation comprises the establish to add the storage devices to the connection path group, further comprising, in response to all of the storage devices being successfully added to the connection path group:

receiving a chain of commands for a storage device successfully added to the identified connection path group;

determining whether there is an outstanding attention interrupt; and if there is an outstanding attention interrupt, then presenting the outstanding attention interrupt to the host.

15. The method of claim 9 further comprising, in response to a particular storage device being in a reset event state, skipping the adding of the particular storage device to the connection path group.

16. A system comprising:

a logic component for receiving a command indicating an operation comprising at least one of establish, disband, and resign with respect to a connection path group of logical connection paths between a host and a plurality of storage devices, wherein the command indicates the plurality of storage devices and the connection path group to which the operation is to be applied;

a logic component for performing the operation indicated in the command with respect to the logical connection paths of the connection path group and each one of the storage devices indicated in the command; and a logic component for reporting to the host information on a success or failure of the operation performed with respect to the storage devices.

17. The system of claim 16, wherein the plurality of storage devices are identified by a device list associated with the command, further comprising a logic component to process the command to inform at least one of the storage devices indicated in the command of the identity of the host.

18. The system of claim 16, further comprising a logic component for presenting an ending status to the host upon successfully accepting the command and verifying command parameters of the command.

19. The system of claim 16 further comprising, wherein the operation comprises the establish to add the storage devices to the connection path group, in response to at least one of the plurality of storage devices being unsuccessfully added to the connection path group, a logic component for reporting a device status and presenting an attention interrupt to the host.

20. The system of claim 16, wherein the operation comprises the establish to add the storage devices to the connection path group, further comprising, in response to all of the storage devices being successfully added to the identified connection path group:

a logic component for receiving a chain of commands for a storage device successfully added to the connection path group;

a logic component for determining whether there is an outstanding attention interrupt; and if there is an outstanding attention interrupt, a logic component for presenting the outstanding attention interrupt to the host.

* * * * *